United States Patent
Park et al.

(10) Patent No.: US 11,250,643 B2
(45) Date of Patent: Feb. 15, 2022

(54) METHOD OF PROVIDING VIRTUAL EXHIBITION SPACE USING 2.5-DIMENSIONALIZATION

(71) Applicant: DIFT CORPORATION, Seoul (KR)

(72) Inventors: Chi Hyung Park, Seoul (KR); Dong Ree Kim, Hwaseong-si (KR); Nam Hyun Kim, Goyang-si (KR); In Je Cho, Seoul (KR)

(73) Assignee: DIFT CORPORATION, Seoul (KR)

( * ) Notice: Subject to any disclaimer, the term of this patent is extended or adjusted under 35 U.S.C. 154(b) by 0 days.

(21) Appl. No.: 17/091,065

(22) Filed: Nov. 6, 2020

(65) Prior Publication Data
US 2021/0090352 A1    Mar. 25, 2021

Related U.S. Application Data

(63) Continuation of application No. PCT/KR2019/001643, filed on Feb. 11, 2019.

(30) Foreign Application Priority Data

May 8, 2018    (KR) .................. 10-2018-0052524

(51) Int. Cl.
*G06T 19/20*    (2011.01)
*G06T 7/60*    (2017.01)

(52) U.S. Cl.
CPC .............. *G06T 19/20* (2013.01); *G06T 7/60* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

2005/0030309 A1*  2/2005  Gettman ............... G06F 16/954
                                                    345/419
2009/0254843 A1* 10/2009  Van Wie ............... G06F 3/0482
                                                    715/757
(Continued)

FOREIGN PATENT DOCUMENTS

KR    10-2014-0082610 A    7/2014
KR    10-2014-0145217 A    12/2014
(Continued)

OTHER PUBLICATIONS

International Search Report issued in PCT/KR2019/001643; dated May 24, 2019.

*Primary Examiner* — Jennifer Mehmood
*Assistant Examiner* — Jed-Justin Imperial
(74) *Attorney, Agent, or Firm* — Studebaker & Brackett PC

(57) ABSTRACT

A method for providing a virtual exhibition space by using a 2.5-dimensionalization is provided. The method comprises the steps of: preparing a spatial image in which an exhibition space including wall surfaces is three-dimensionally depicted; acquiring, with respect to the exhibition space, scale and gradient values of the wall surfaces in the spatial image; preparing a wall surface image of a specific wall surface, from among the wall surfaces in the spatial image, in which the specific wall surface is two-dimensionally depicted; overlapping and arranging an image of a work in a specific size and at a specific location on the wall surface image; generating a snapshot image of the specific wall surface having the image of the work overlapped and arranged on the wall surface image; and using (i) scale and gradient values of the specific wall surface in the spatial image and (ii) the snapshot image so as to overlap and (Continued)

arrange the snapshot image on the specific wall surface in the spatial image, thereby generating an exhibition image.

17 Claims, 11 Drawing Sheets

(56) References Cited

U.S. PATENT DOCUMENTS

| | | | | |
|---|---|---|---|---|
| 2015/0091906 A1* | 4/2015 | Dishno | ............... | G06F 16/9577 |
| | | | | 345/427 |
| 2020/0082604 A1* | 3/2020 | Kim | ........................ | G06T 15/60 |
| 2021/0090330 A1* | 3/2021 | Park | ...................... | G06T 19/006 |

FOREIGN PATENT DOCUMENTS

| KR | 10-2015-0113246 A | 10/2015 |
|---|---|---|
| KR | 10-1647371 B1 | 8/2016 |
| KR | 10-2017-0051019 A | 5/2017 |
| KR | 10-2017-0107581 A | 9/2017 |

* cited by examiner

METHOD OF PROVIDING VIRTUAL EXHIBITION SPACE USING 2.5-DIMENSIONALIZATION

CROSS-REFERENCE TO RELATED APPLICATIONS

The present application is a Continuation of International Patent Application No. PCT/KR2019/001643, filed on Feb. 11, 2019, which is based upon and claims the benefit of priority to Korean Patent Application No. 10-2018-0052524 filed on May 8, 2018. The disclosures of the above-listed applications are hereby incorporated by reference herein in their entirety.

BACKGROUND

Embodiments of the inventive concept described herein relate to a virtual exhibition space, and more particularly, relate to a method for providing a virtual exhibition space using 2.5-dimensionalization.

Recently, with the development of information communication technology, a virtual gallery service has been provided. As an example, one virtual gallery service is a flat service of arranging two-dimensional work images on a two-dimensional wall surface image, another virtual gallery service is served by configuring three-dimensional graphics of a virtual gallery using a three-dimensional engine, and another virtual gallery service is served such that users view and experience works exhibited on a VR gallery space using a VR technology.

A conventional flat gallery service has a disadvantage incapable of providing a stereoscopic gallery service. A gallery service using the two-dimensional engine or the VR technology takes a long time because there are a considerable size of data and a considerable number of data and is involved in damage of work content. A user terminal for using the gallery service requires high performance.

SUMMARY

Embodiments of the inventive concept are to quickly and efficiently generate a stereoscopic exhibition image for providing a virtual exhibition space.

Embodiments of the inventive concept are to generate a stereoscopic exhibition image for providing a virtual exhibition space without damage of work content.

Embodiments of the inventive concept are to generate a stereoscopic exhibition image for providing a virtual exhibition space to be easily processed by a user terminal having general function.

The technical problems to be solved by the inventive concept are not limited to the aforementioned problems, and any other technical problems not mentioned herein will be clearly understood from the following description by those skilled in the art to which the inventive concept pertains.

According to an exemplary embodiment, a virtual exhibition space providing method may include preparing for a space image in which an exhibition space including a plurality of wall surfaces is expressed in three dimensions, obtaining scales and slope values of the plurality of wall surfaces on the space image with respect to the exhibition space by analyzing the plurality of wall surfaces on the space image, preparing for a wall surface image of a specific wall surface, the wall surface image being where the specific wall surface among the plurality of wall surfaces on the space image is expressed in two dimensions, overlapping and arranging one or more work images at a specific size at a specific location on the wall surface image, generating a snapshot image of the specific wall surface, the snapshot image being where the one or more work images are overlapped and arranged on the wall surface image, and generating an exhibition image by overlapping and arranging the snapshot image on the specific wall surface of the space image using i) the scale and the slope value of the specific wall surface on the space image and ii) the snapshot image to follow a stereoscopic element of the space image.

The other details of the inventive concept may be included in the detailed description and the drawings.

DETAILED DESCRIPTION

Figure 1:
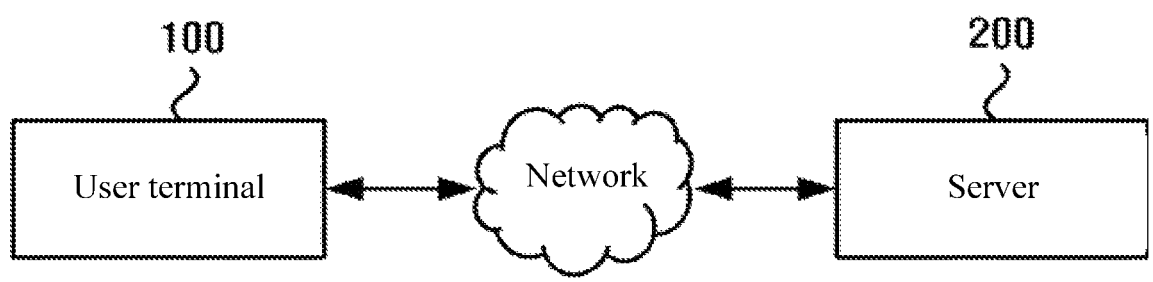
FIG. 1 is a block diagram schematically illustrating an environment to which a virtual exhibition space providing service is applied.

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/ or "comprising" used herein indicate existence of one or more other elements other than stated elements but do not exclude presence of additional elements. Like reference numerals designate like elements throughout the specification, and the term "and/or" may include each of stated elements and one or more combinations of the stated elements. The terms such as "first" and "second" are used to describe various elements, but it is obvious that such elements are not restricted to the above terms. The above terms are used only to distinguish one element from the other. Thus, it is obvious that a first element described hereinafter may be a second element within the technical scope of the inventive concept.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Spatially relative terms, such as "below", "beneath", "lower", "above", "upper", and the like, may be used herein to describe the relationship of one component to another component as illustrated in the figures. It will be understood that the spatially relative terms are intended to encompass different orientations of components in use or operation, in addition to the orientation depicted in the figures. For example, when the component in the figures is turned over, components described as "below" or "beneath" other components would then be oriented "above" the other components. Thus, the exemplary term "below" may encompass both an orientation of above and below. The component may be otherwise oriented, and the spatially relative descriptors used herein may be spatially interpreted according to orientation accordingly.

Hereinafter, an embodiment of the inventive concept will be described in detail with reference to the accompanying drawings.

The "2.5 dimensions" in the specification may refer to describing and expressing an object on a two-dimensional plane in the form of two dimensions, and the "2.5-dimensionalization" in the specification may refer to converting a two-dimensional object into a 2.5-dimensional object. The 2.5 dimensions may be based on cognitive illusion of a person.

The "work image" in the specification may include an image of any creative work expressible in the form of a photo, a picture, and the other images as creative works by an artist.

The "virtual exhibition space" in the specification may be a cyberspace which is present on the network, which may be used as the meaning of place capable of reading various data and information about an exhibition image and a work image.

FIG. 1 is a block diagram schematically illustrating an environment to which a virtual exhibition space providing service is applied.

Referring to FIG. 1, a user terminal 100 and a server 200 may be connected to each other over a network. The user terminal 100 and the server 200 may transmit and receive various data and/or information. The network may include a wired or wireless network. A size, topology, a communication scheme, or the like of the network may be transformed and provided in various manners according to an embodiment.

The user terminal 100 may indicate a computer system used by a user. For example, the user terminal 100 may be provided as a mobile computer system such as a smartphone, a tablet, a personal digital assistant (PDA). Alternatively, the user terminal 100 may be provided as a fixed computer system such as a laptop or a desktop. The user terminal 100 is not limited to the above-mentioned examples, which may be provided as any computer system which is connectable with the server 200 over the network and has its display. The user terminal 100 may store and run an application for interworking with the server 200. The application may include various instructions, data, and information.

The server 200 may provide a virtual exhibition space. The server 200 may provide the user terminal 100 with an exhibition image depending on a request from the user terminal 100. The exhibition image may be provided as a stereoscopic image as described below. In some embodiments, the exhibition image may be drawn by linear perspective. Furthermore, the exhibition image may be drawn to have a certain view point and a certain number of vanishing points. Because a detailed description of the linear perspective blurs the gist of the inventive concept, a description thereof will be omitted.

As will be described below, a snapshot image may be used to generate a stereoscopic exhibition image. The snapshot image may be an image in which one or more work images are overlapped and arranged on a planar image of a wall surface. The stereoscopic exhibition image may be generated through 2.5-dimensionaization of such a two-dimensional snapshot image.

Meanwhile, unlike that illustrated in FIG. 1, the plurality of user terminals 100 may be connected with the server 200. One user terminal 100 may be used by a first user, and another user terminal 100 may be used by a second user. The first user may be a manager (e.g., an artist, a curator, a collector, or the like) of a virtual exhibition space, who registers a work image for exhibition as described below. The second user may be a viewer of the virtual exhibition space, who may read and view an exhibition image and a work image as described below. It may be clearly understood that one user may be divided into the first user and the second user at the same time.

Figure 2:
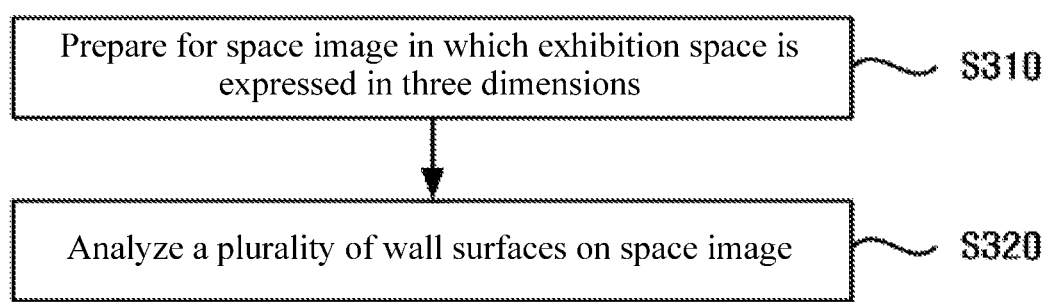
FIG. 2 is a flowchart schematically illustrating a process of setting a space image in a virtual exhibition space providing method according to an embodiment of the inventive concept.

FIG. 2 is a flowchart schematically illustrating a process of setting a space image in a virtual exhibition space providing method according to an embodiment of the inventive concept.

Referring to FIG. 2, in step S310, a server 200 may prepare for a space image on which an exhibition space is expressed in three dimensions. The space image may define a virtual (i.e., non-existent) exhibition space. The space image may be inherent in an application and may be previously stored in a user terminal 100.

Figure 3:
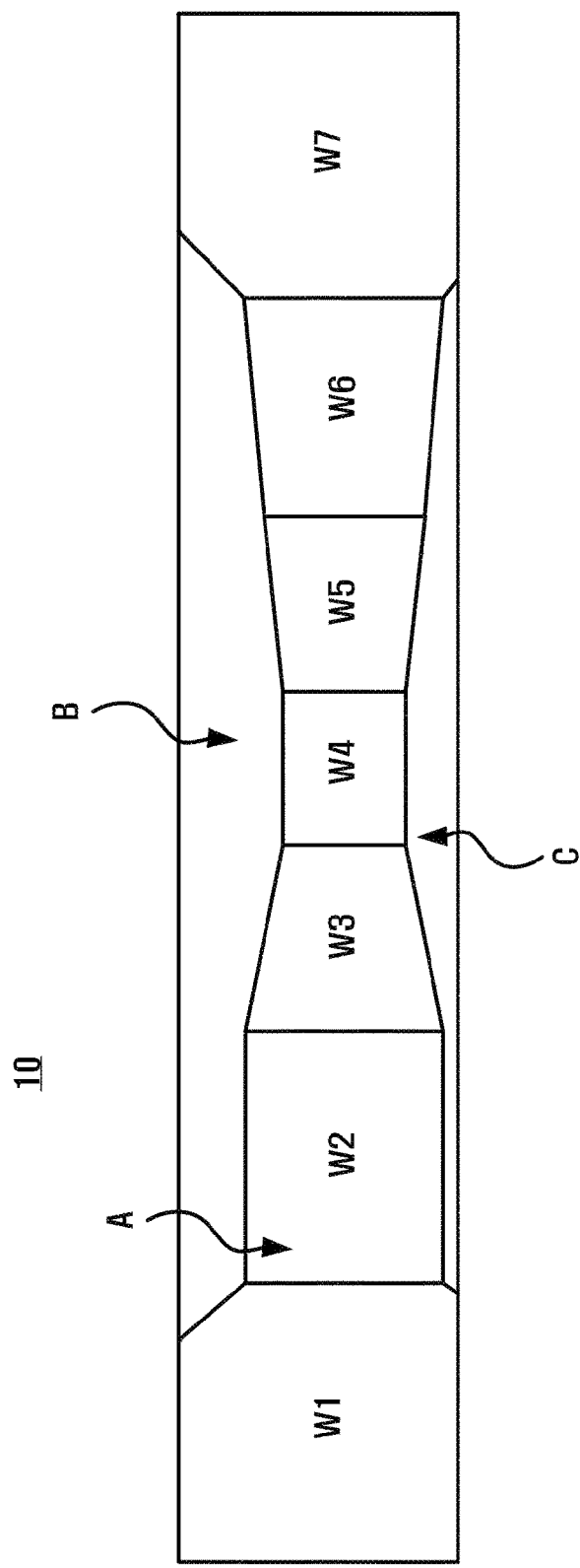
FIG. 3 is a drawing schematically illustrating a space image in which an exhibition space is expressed in three dimensions.

FIG. 3 is a drawing schematically illustrating a space image in which an exhibition space is expressed in three dimensions.

As shown in FIG. 3, in some embodiments, a space image 10 may be drawn by linear perspective. Furthermore, the space image 10 may have a shape where a plurality of one-point perspective or a plurality of two-point perspective are integrated. In other words, the space image 10 may be drawn to have a plurality of viewpoints and one or more vanishing points corresponding to each view point.

An exhibition space may include a plurality of surfaces in the space image 10. Herein, the surfaces may include a plurality of wall surfaces A, a ceiling surface B, and a bottom surface C. In some embodiments, the ceiling surface B may be expressed in a form where the ceiling is omitted and opened. As will be described below, in general, the wall surfaces A may be used for layout and exhibition of a work image, but, in some embodiments, the ceiling surface B or the bottom surface C may be used for the layout and exhibition of the work image. The number of the wall surfaces A may be increased and decreased in various manners according to an embodiment. A layout form of the wall surfaces A may be transformed in various manners according to an embodiment.

Meanwhile, although not clearly illustrated in FIG. 3, in some embodiments, light, shading, a color, a shadow, or the like may be further expressed on the space image 10. Furthermore, things (for interior design) other than a work may be further expressed on the space image 10.

In some embodiments, a rate of each of the wall surfaces A of the exhibition space defined by the space image 10 may be uniformly fixed. In other words, horizontal to vertical ratios of the plurality of wall surfaces A may be fixed to the same value. The ratio may be determined in advance. Meanwhile, a size of each of the plurality of wall surfaces A may fail to be uniformly fixed. For example, the ratio of the plurality of wall surfaces A may be 16:9, which may be fixed to an aspect ratio of a general mobile computer system. As a result, as will be described below, when providing a user with a wall surface image or a snapshot image expressed in two dimensions, the image may be displayed to be filled in the entire region of a screen of a user terminal 100. Meanwhile, the ratio of the plurality of wall surfaces 10 is not limited to the example.

Figure 4:
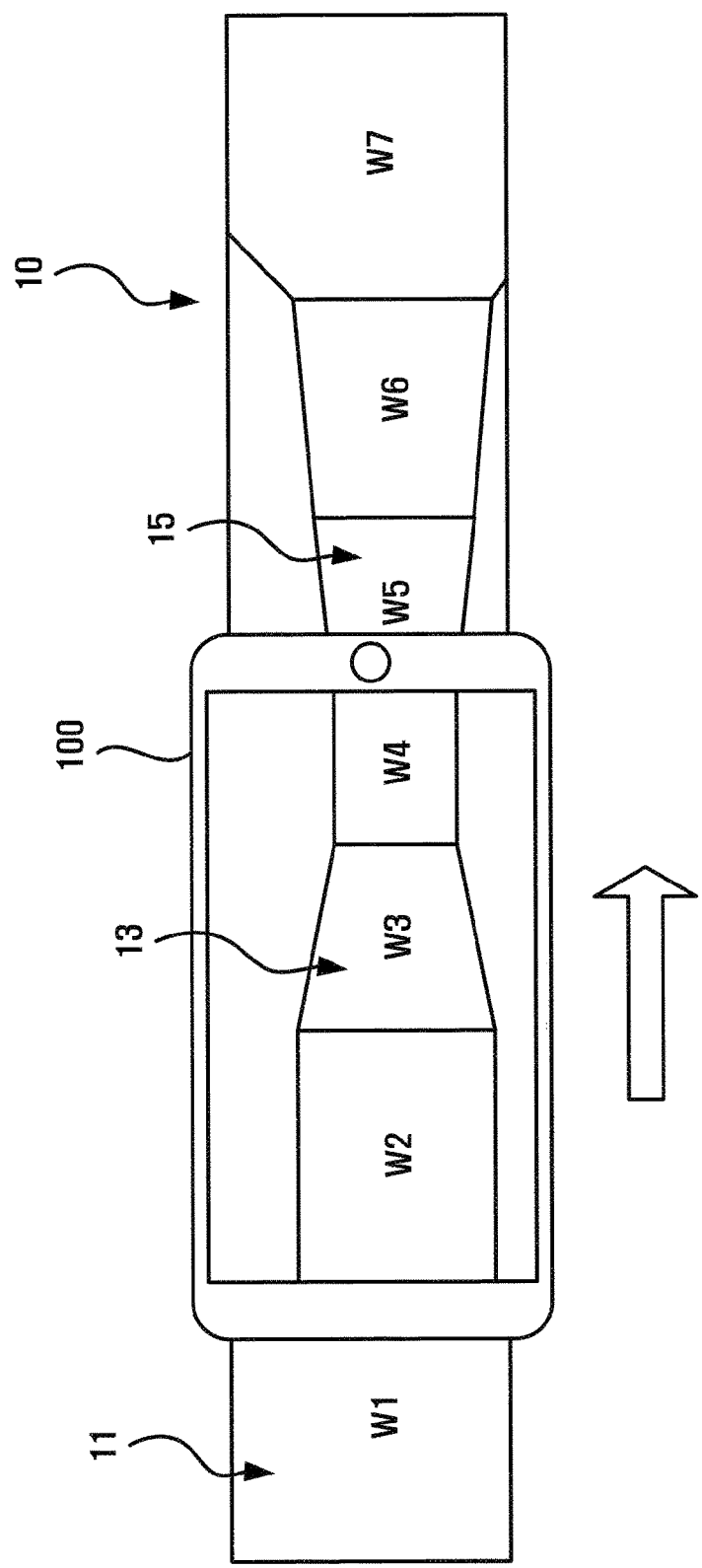
FIG. 4 is a drawing schematically illustrating a case whether a space image is provided to a user via a user terminal.

FIG. 4 is a drawing schematically illustrating a case whether a space image is provided to a user via a user terminal. FIG. 4 illustrates a case whether a user terminal 100 is a smartphone.

As shown in FIG. 4, because a space image 10 has a shape elongated in a horizontal direction, a region capable of being displayed on a screen of the user terminal 100 may be limited. According to a location of a view point of a user in a virtual exhibition space, some wall surfaces (e.g., 13) may be displayed on the screen of the user terminal 100 and other wall surfaces (e.g., 11 and 15) may fail to be displayed on the screen of the user terminal 100. As the location of the view point of the user is moved, the region of the space image 10 displayed on the screen of the user terminal 100 may be changed. The location of the view point of the user may be moved intermittently or continuously. An operation for moving the location of the view point of the user may be performed in various manners.

Meanwhile, like the space image 10, a region capable of being displayed on the screen of the user terminal 100 may be limited in an exhibition image 50 described below.

In some embodiments, the space image 10 may has a shape elongated in a vertical direction.

Referring again to FIG. 2, subsequently, in step S320, the server 200 may analyze a plurality of wall surfaces on the space image 10. As a result of analyzing the space image 10, the server 200 may obtain scales of the plurality of wall surfaces of the space image 10 and may obtain slope values of the plurality of wall surfaces. Herein, the obtained scale and the obtained slope value of each wall surface may be used to adjust a snapshot image described below.

Figure 5:
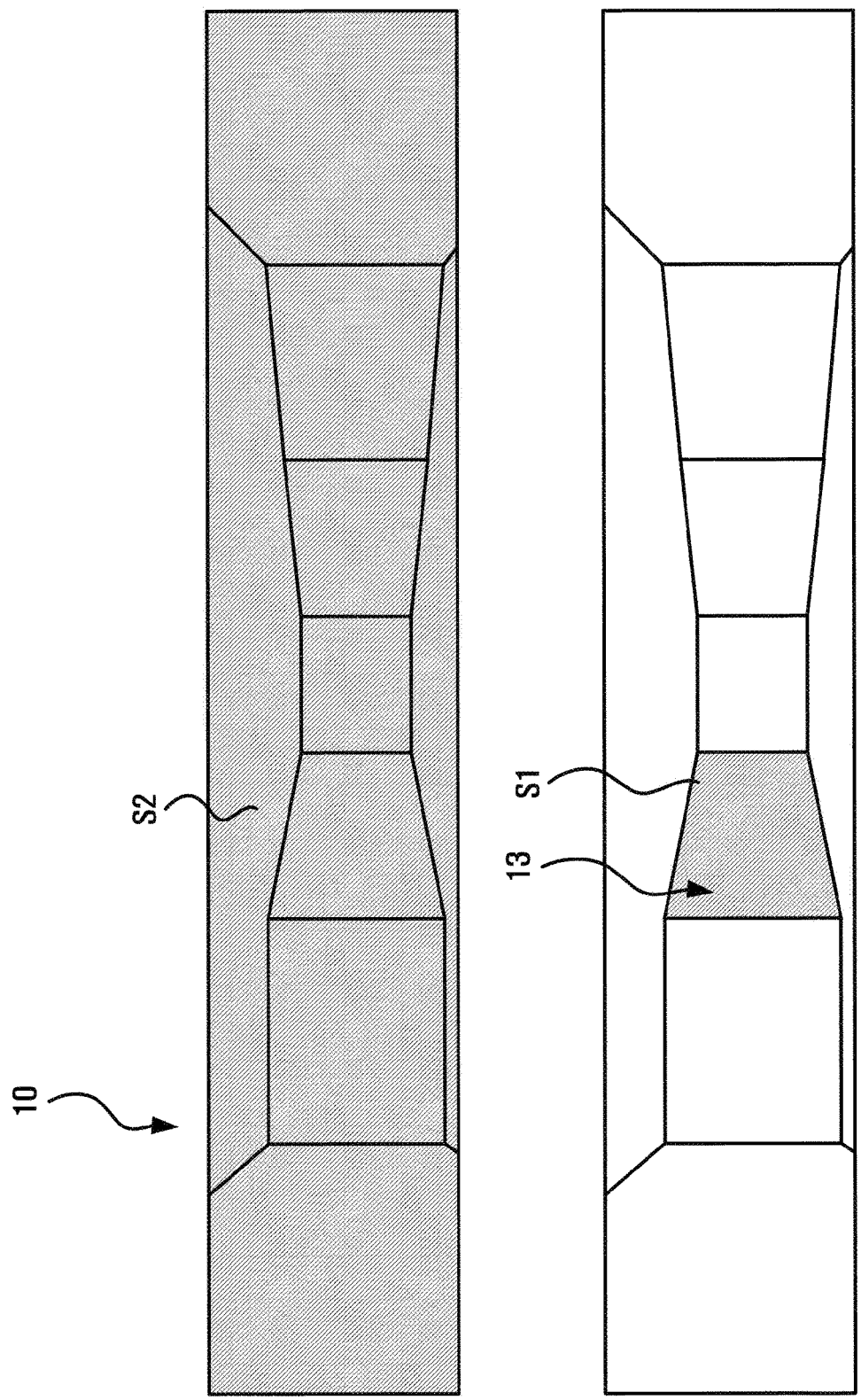
FIGS. 5 and 6 are drawings schematically illustrating analyzing scales and slope values of a plurality of wall surfaces.
Figure 6:
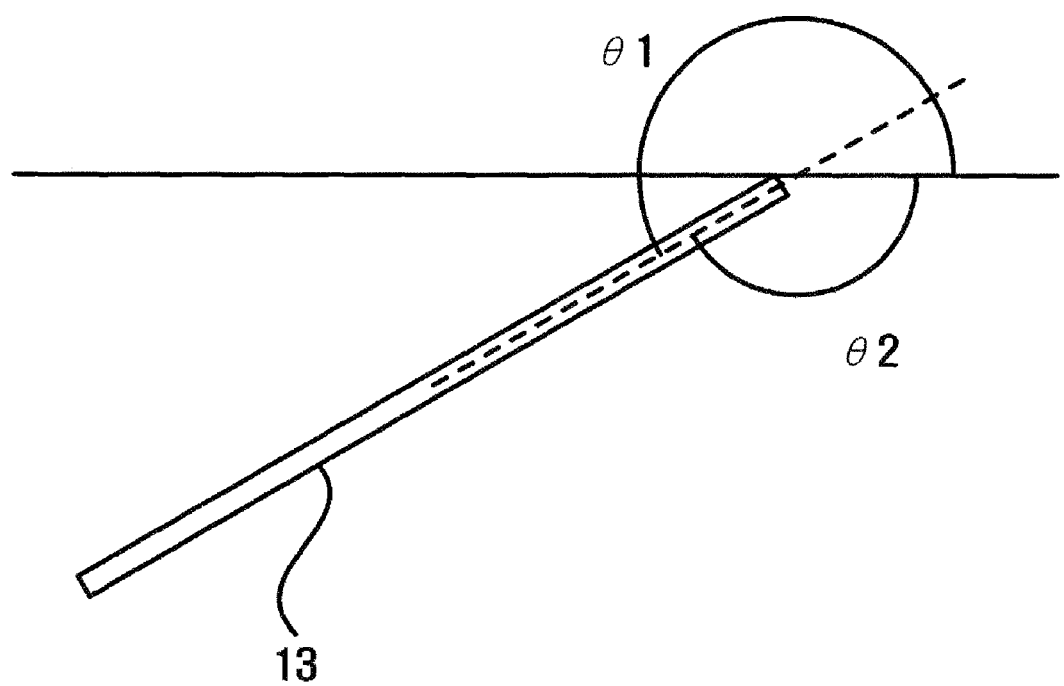

FIGS. 5 and 6 are drawings schematically illustrating analyzing scales and slope values of a plurality of walls. FIGS. 5 and 6 illustrate a case where a scale and a slope value of a specific wall surface 13 are analyzed.

Referring to FIG. 5, the scale may refer to the ratio of a wall surface to an exhibition space. In other words, the scale may refer to the ratio (S1:S2) of an area S1 of each wall surface 13 to the entire area S2 of the exhibition space expressed on a space image 10.

Referring to FIG. 6, assuming that a view point of a user is located in front of each wall surface 13 in the space image 10, the slope value may indicate a degree to which each wall surface 13 is sloped in a clockwise direction or a counterclockwise direction on a plane. A server 200 may obtain coordinates of four corners of the plurality of wall surfaces 13 of the space image 10 and may obtain slope values of the plurality of wall surfaces 13 based on a fixed ratio (e.g., 16:9) of the plurality of wall surfaces 13 and the coordinates of the four corners of the plurality of wall surfaces 13.

FIG. 6 illustrates an appearance (e.g., a plan view) where a specific wall surface 13 is seen on a plane in a virtual exhibition space. The server 200 may obtain an angle of θ1 or θ2 shown in FIG. 6 as a slope value.

Figure 7:
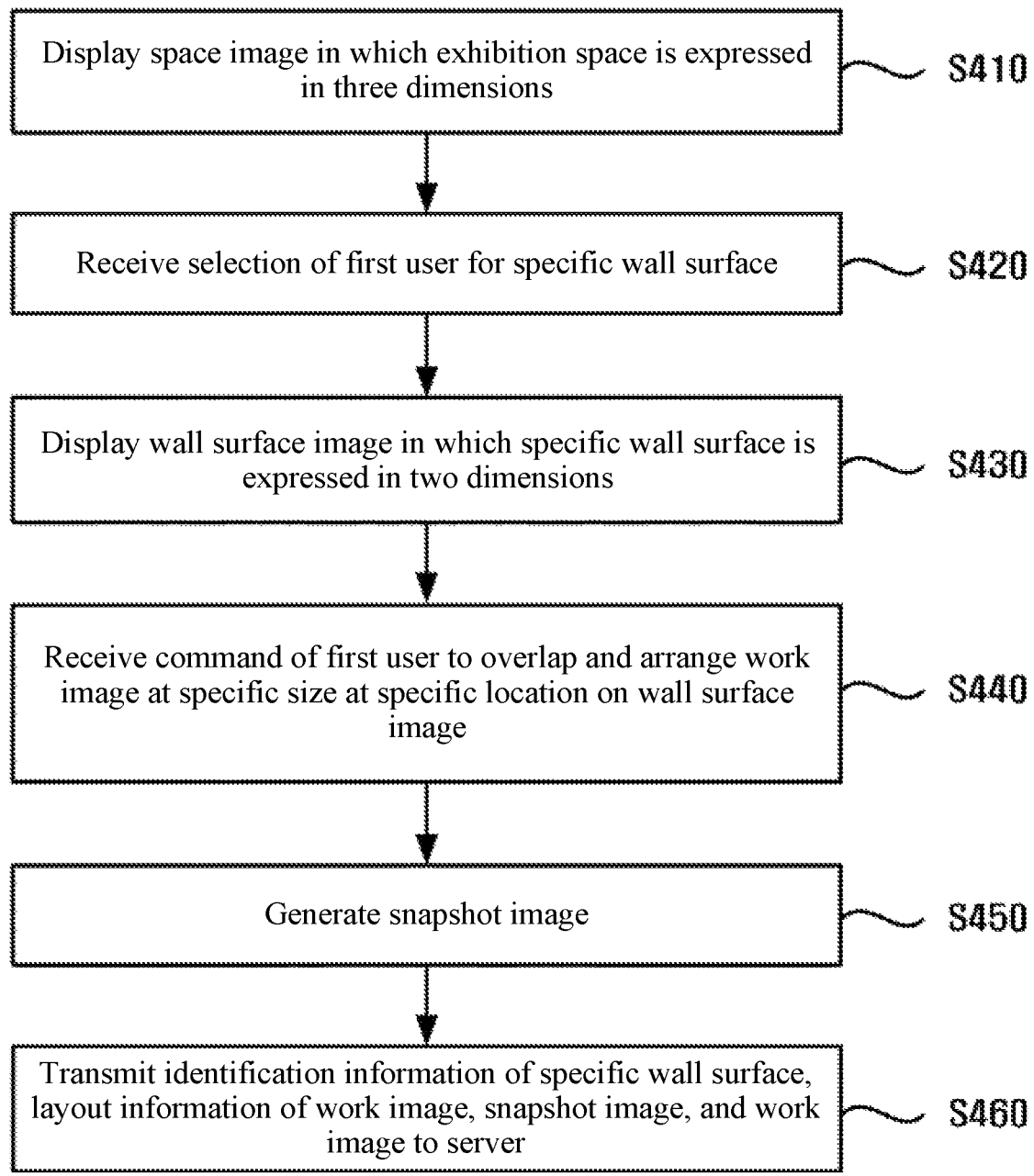
FIG. 7 is a flowchart schematically illustrating a process of registering a work in a virtual exhibition space providing method according to an embodiment of the inventive concept.

FIG. 7 is a flowchart schematically illustrating a process of registering a work in a virtual exhibition space providing method according to an embodiment of the inventive concept.

Referring to FIG. 7, in step S410, a user terminal 100 may display a space image 10 in which an exhibition space is expressed in three dimensions on its screen. The space image 10 may be provided for each exhibition space. A first user may select a specific exhibition space among a plurality of exhibition spaces, and the user terminal 100 may display the space image 10, in which the selected exhibition space is expressed, on the screen.

Subsequently, in step S420, the user terminal 100 may receive a selection of the first user for a specific wall surface among a plurality of wall surfaces on the space image 10. Subsequently, in step S430, the user terminal 100 may display a wall surface image of the specific wall surface, in which the specific wall surface is expressed in two dimensions, on the screen. Subsequently, the user terminal 100 may receive a command of the first user to overlay and arrange one or more work images at a specific size at a specific location on the wall surface image. The user terminal 100 may obtain layout information of the one or more work images, including the specific location and the specific size.

Figure 8:
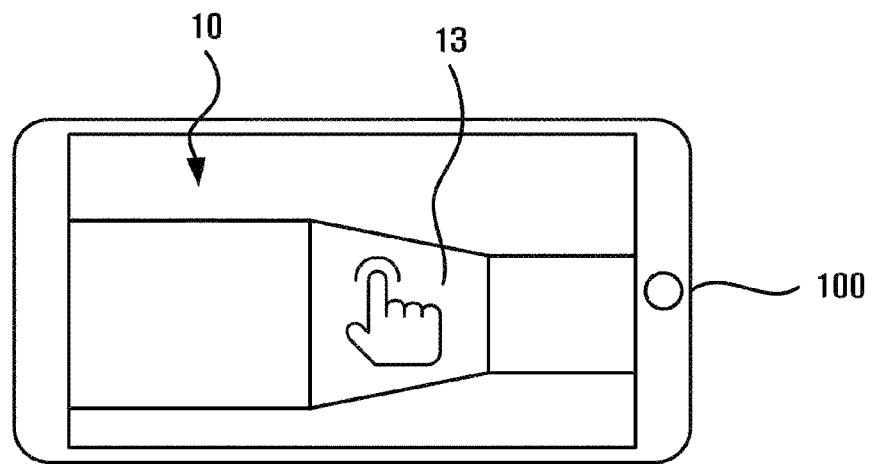
FIGS. 8 and 9 are drawings schematically illustrating arranging work images on a wall surface image of a specific wall surface.
Figure 9:
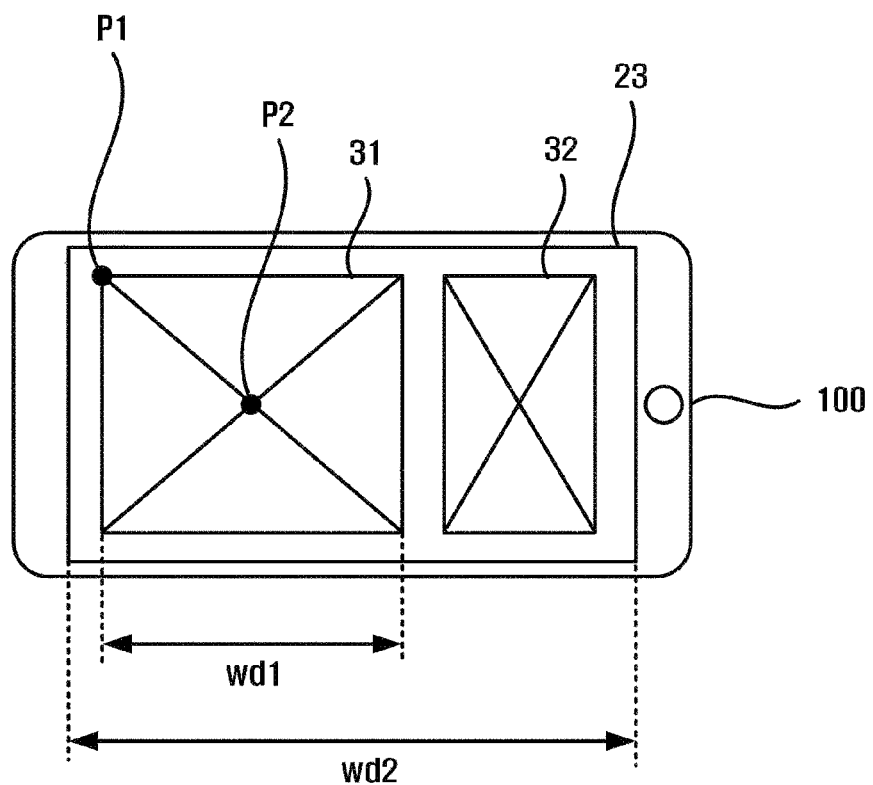

FIGS. 8 and 9 are drawings schematically illustrating arranging work images on a wall surface image of a specific wall surface. FIGS. 8 and 9 illustrates a case whether a user terminal 100 is a smartphone.

Referring to FIG. 8, the user terminal 100 may display a space image 10 on its screen, and a first user may select a specific wall surface 13 among a plurality of wall surfaces on the space image 10 in such a manner as to perform touch.

Referring to FIG. 9, the user terminal 100 may display a wall surface image 23, in which the specific wall surface 13 is expressed in two dimensions, on the screen. The wall surface image 23 may express a wall surface in a state where a work is not disposed. In some embodiments, the wall surface image 23 may be displayed on the entire region of the screen of the user terminal 100. The first user may select one or more work images 31 and 32 stored in the user terminal 100, a cloud storage, or the like and may overlap and arrange the one or more selected work images 31 and 32 on the wall surface image 23. The first user may adjust the one or more work images 31 and 32 to a specific size and may arrange the one or more adjusted work images 31 and 32 into a specific location. In FIG. 9, the two work images 31 and 32 are shown, but one work image or three or more work images may be arranged. When the user terminal 100 is a smartphone, a command of the first user to arrange the one or more work images 31 and 32 may be provided as a touch or a specific gesture. Furthermore, the command of the first user may include one or more of movement, rotation, zoom-in, and zoom-out of the one or more work images 31 and 32.

In some embodiments, a location of the work image 31 may be defined by coordinates of one or more certain corners P1 of the work image 31 or coordinates of the center P2. Herein, the coordinates may be defined by a relative relationship with respect to a specific wall surface on which the work image 31 is disposed (i.e., a coordinate system of the specific wall surface). For example, coordinates of a certain corner of the specific wall surface may be defined as (0. 0). In some embodiments, a size of the wall surface 31 may be defined by the ratio (wd1:wd2) of a width wd1 of each work image 31 to the entire width wd2 of the specific wall surface. However, the manner which defines the location and size of the work image 31 is not limited thereto.

Subsequently, in step S450, the user terminal 100 may generate a snapshot image of the specific wall surface, in which one or more work images are overlapped and arranged on the wall image 23. In other words, the snapshot image may be generated by capturing a wall surface image in which the one or more work images are arranged. As will be described below, the snapshot image may be used for the purpose of reducing a load time a user feels by temporarily displaying a work image or the like before receiving and loading the work image or the like from the server 200. In some embodiments, quality of the snapshot image may be preset and may be lower than that of a work image. This is to reduce a size of data and reduce a loading time. In some embodiments, the snapshot image may be generated only for a wall surface on which a work is disposed.

Subsequently, in step S460, the user terminal 100 may transmit identification information of the specific wall surface, layout information of the one or more work images, a snapshot image 43, and the one or more work images 31 and 32 to the server 200.

Figure 10:
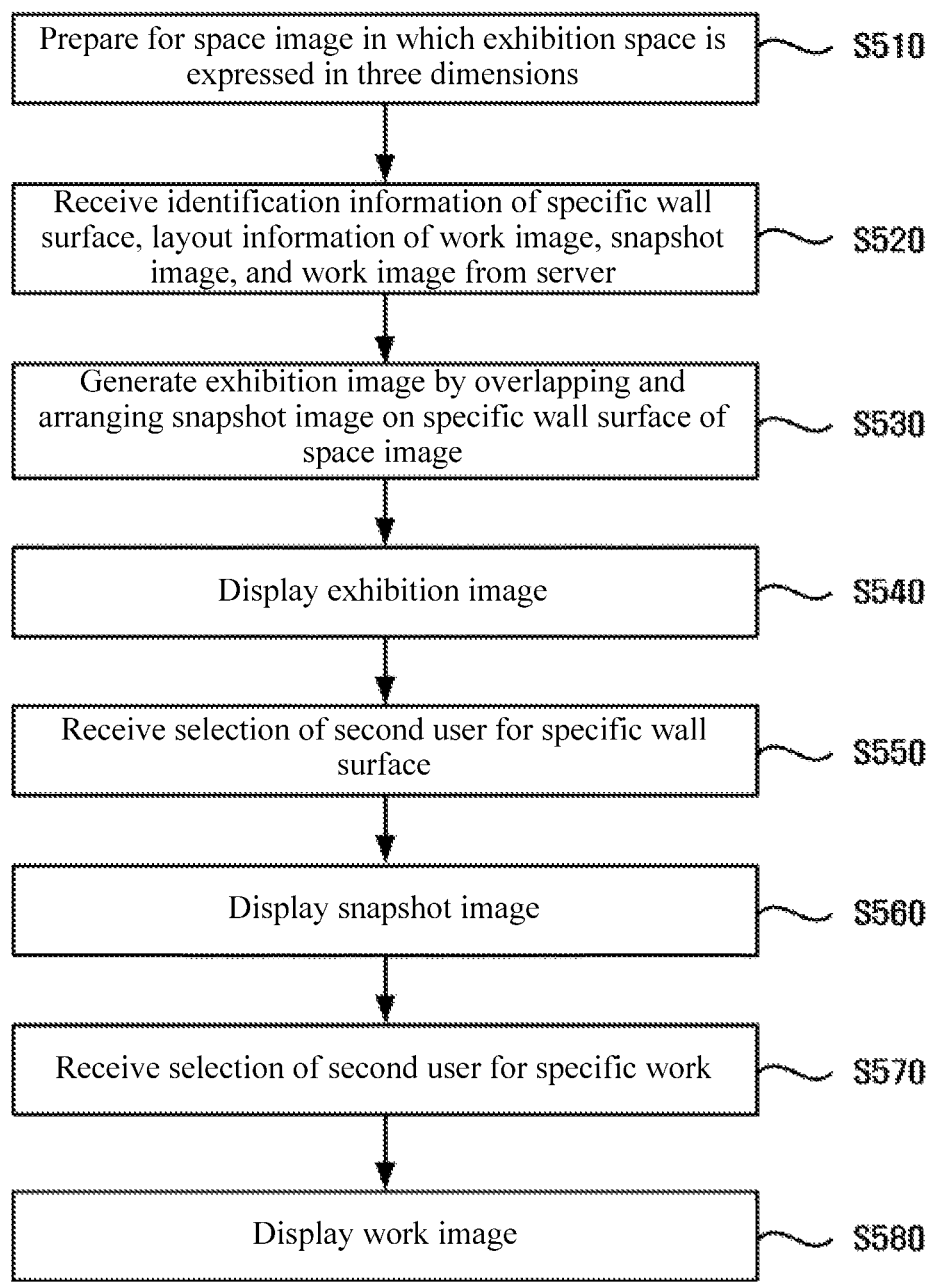
FIG. 10 is a flowchart schematically illustrating a process of viewing a work in a virtual exhibition space providing method according to an embodiment of the inventive concept.

FIG. 10 is a flowchart schematically illustrating a process of viewing a work in a virtual exhibition space providing method according to an embodiment of the inventive concept.

Referring to FIG. 10, in step S510, a user terminal 100 may prepare for a space image 10 in which an exhibition space is expressed in three dimensions. The space image 10 may be provided for each exhibition space. A second user may select a specific exhibition space among a plurality of exhibition spaces, and the user terminal 100 may prepare for the space image 10 in which the selected exhibition space is expressed. The space image 10 may be inherent in an application and may be previously stored in the user terminal 100.

Subsequently, in step S520, the user terminal 100 may receive identification information of a specific wall surface among a plurality of wall surfaces on the space image 10 and a snapshot image of the specific wall surface, in which the specific wall surface is expressed in two dimensions and in which one or more works are arranged and expressed at a specific size at a specific location on the specific wall surface. In other words, the user terminal 100 may receive the snapshot image of the specific wall surface, which is generated in step S450. In some embodiments, the user terminal 100 may receive the snapshot image only for a wall surface on which a work image is disposed in a process of registering a work. Furthermore, the user terminal 100 may receive layout information of one or more work images and the one or more work images 31 and 32 from the server 200.

Subsequently, in step S530, the user terminal 100 may adjust the snapshot image using a scale and a slope value of the specific wall surface on the space image 10 corresponding to the identification information of the specific wall surface and the snapshot image to follow a stereoscopic element of the space image 10 and may overlap and arrange the adjusted snapshot image on the specific wall surface of the space image 10 to generate an exhibition image. In step S540, the user terminal 100 may display the exhibition image on the screen. Herein, "follow the stereoscopic element" may refer to being adjusted by linear perspective to have the same view point and vanishing point as the specific wall surface on the space image 10 unlike original two-dimensional expression. The stereoscopic element may include, for example, a view point or a vanishing point.

Figure 11:
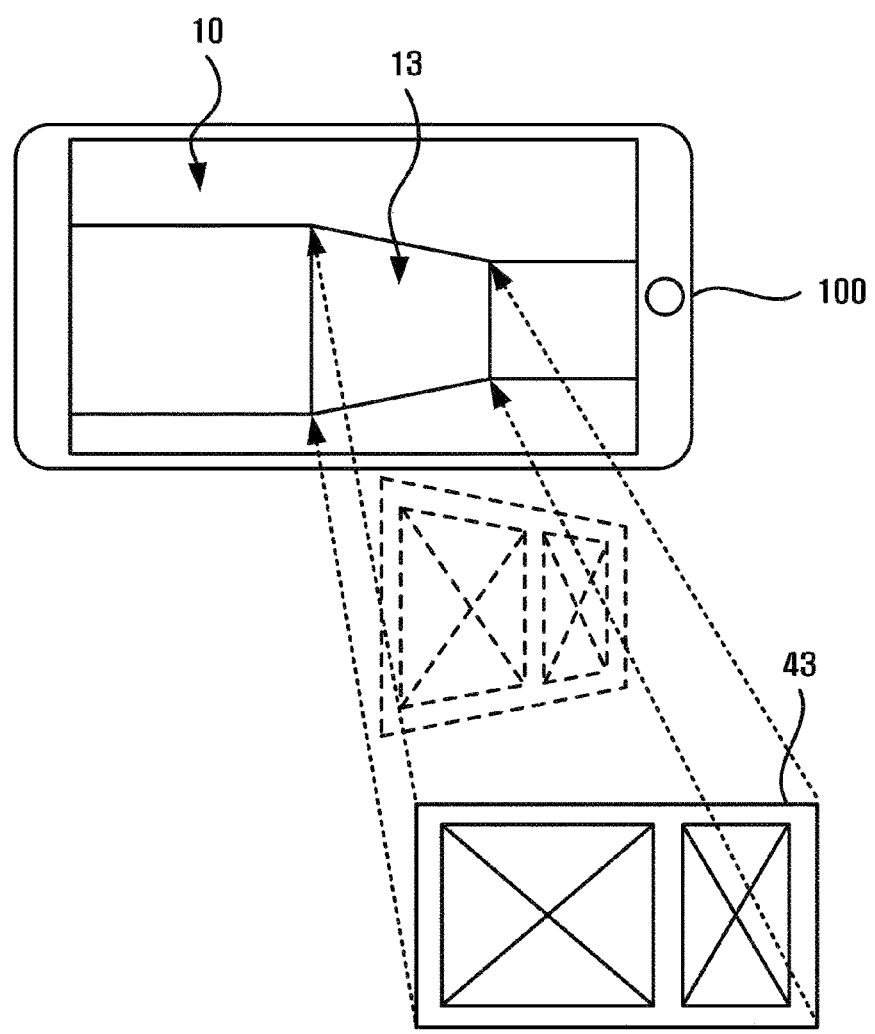
FIGS. 11 and 12 are drawings schematically illustrating overlapping and arranging snapshot images on a space image to generate an exhibition image.
Figure 12:
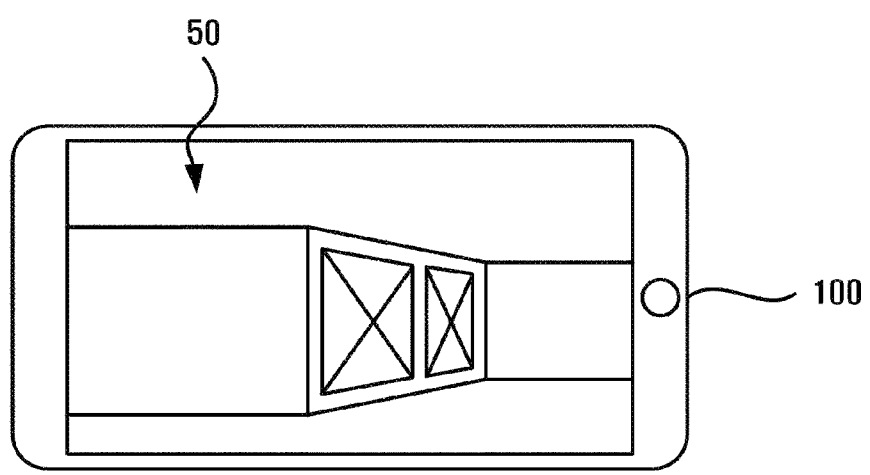

FIGS. 11 and 12 are drawings schematically illustrating overlapping and arranging snapshot images on a space image to generate an exhibition image.

Referring to FIG. 11, a user terminal 100 may prepare for a space image 10. In FIG. 11, it is shown that the user terminal 100 displays the space image 10 on its screen, but this is to help understanding of the inventive concept through comparison of the space image 10 and an exhibition image 50 and the user terminal 100 does not actually display the space image 10 on the screen. Because the space image 10 only expresses an exhibition space, a work image may fail to be disposed on a specific wall surface 13 of the space image 10. The user terminal 100 may receive a snapshot image 43 generated in the above-mentioned process of registering the work, rather than the work image, from a server 200. The user terminal 100 may adjust the snapshot image 43 to follow a stereoscopic element of the space image 10 and may overlap and arrange the adjusted snapshot image 43 on the specific wall surface 13 of the space image 10 to generate the exhibition image 50. The exhibition image 50 may be generated in a form where the space image 10 and the snapshot image 43 are integrated. Particularly, when a plurality of work images is arranged on one wall surface, only one snapshot image about the wall surface where the plurality of work images are arranged may be received from the server 200. The snapshot image may be used to generate the exhibition image.

Subsequently, in step S550, the user terminal 100 may receive a selection of a second user for the specific wall surface among the plurality of wall surfaces on the exhibition image 50. Subsequently, in step S560, the user terminal 100 may display a snapshot image of the specific wall surface, in which the specific wall surface is expressed in two dimensions and in which one or more works are arranged and expressed at a specific size at a specific location on the specific wall surface. Subsequently, in step S570, the user terminal 100 may receive a selection of the second user for a specific work among one or more works on the snapshot image.

Subsequently, in step S580, the user terminal 100 may display a work image (e.g. 31) of the specific work and on the screen using layout information of the work image of the specific work. The layout information of the work image may be used to determine a selection region of the specific work. Furthermore, the layout information of the work image may be used to provide an effect, such as animation, in the process of displaying the work image on the screen. The user may select, zoom in on, and view the work image. As a result, a second user may view each work image in detail, other than the exhibition image 50 and the snapshot image.

Figure 13A:
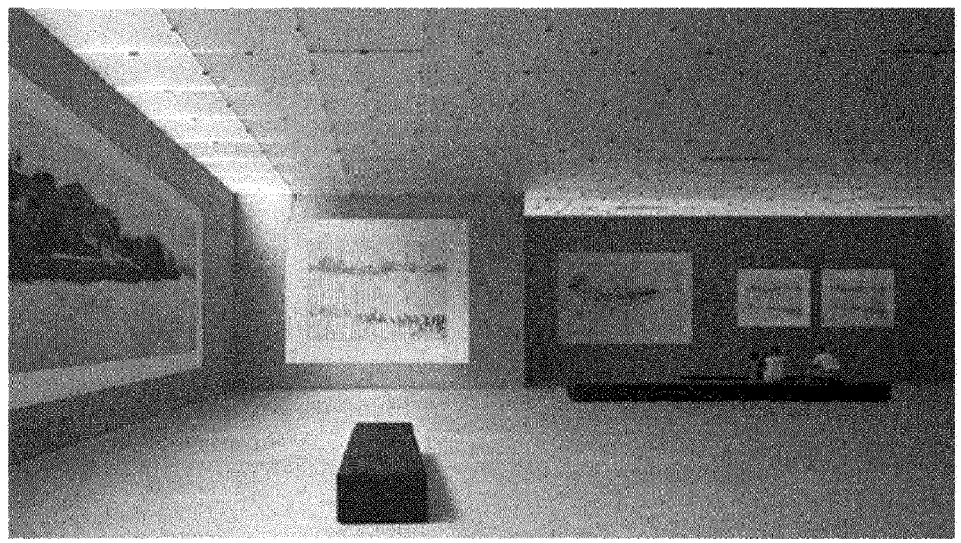
FIGS. 13A and 13B are drawings schematically illustrating an example of an exhibition image generated by a virtual exhibition space providing method according to an embodiment of the inventive concept.
Figure 13B:
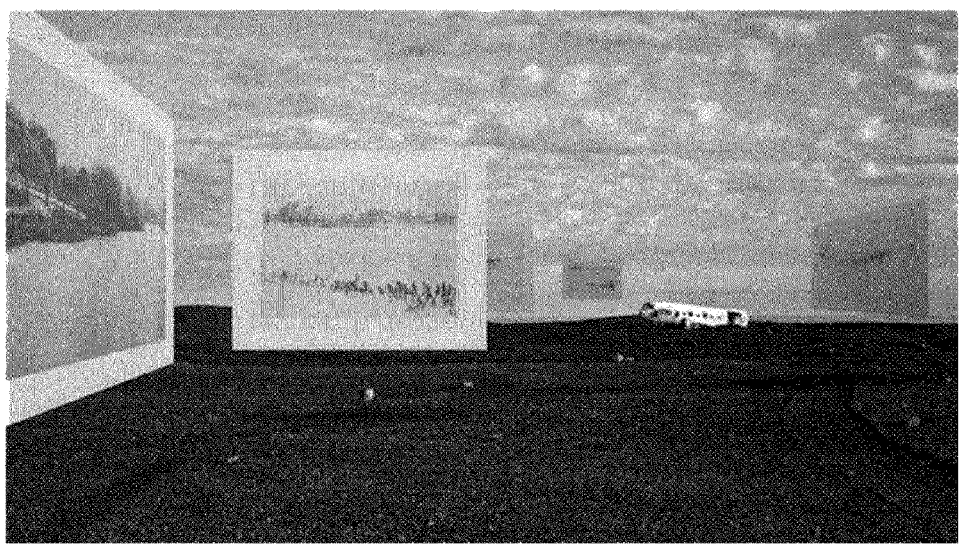

FIGS. 13A and 13B are drawings schematically illustrating an example of an exhibition image generated by a virtual exhibition space providing method according to an embodiment of the inventive concept.

An exhibition image of FIG. 13A may provide a virtual exhibition space similar to a general gallery. An exhibition image of FIG. 13B may provide a virtual exhibition space, which is an outdoor space which is very different from the general gallery and is simultaneously in the form of having a transparent wall surface.

Both the exhibition images of FIGS. 13A and 13B show only a region displayed on a screen of a user terminal 100.

A user terminal may include a processor and a memory. The memory may store a computer program configured to be executed by the processor. The computer program may include instructions for executing steps of the method or algorithm described in conjunction with an embodiment of the inventive concept.

Steps of the method or algorithm described in connection with an embodiment of the inventive concept may be directly implemented in hardware (e.g., an application-specific integrated circuit (ASIC)), may be implemented with a software module (e.g., a computer program) executed by hardware, or may be implemented by a combination of the hardware and the software module. The software module may be recorded in a random access memory (RAM), a read only memory (ROM), an erasable programmable ROM (EPROM), an electrically erasable programmable ROM (EEPROM), a flash memory, a hard disc, a removable disc, a CD-ROM, or any type of computer-readable storage medium which is well known in the technical field to which the inventive concept pertains.

The above-mentioned embodiment of the inventive concept may generate an exhibition image by overlapping and arranging a snapshot image on a specific wall surface of a space image in which an exhibition space is expressed in three dimensions to follow a stereoscopic element of the space image, thus quickly and efficiently generating a stereoscopic exhibition image for providing a virtual exhibition space.

Furthermore, because of not using a three-dimensional engine or a VR technology, the above-mentioned embodiment of the inventive concept may generate a stereoscopic exhibition image for providing a virtual exhibition space without damage of work content.

Furthermore, according to the above-mentioned embodiment of the inventive concept, because the size and the number of data to be processed to provide a virtual exhibition space are relatively small, a relatively short time may be taken to load a stereoscopic exhibition image and a user terminal having general performance may easily process the stereoscopic exhibition image.

The above-mentioned inventive concept may generate an exhibition image by overlapping and arranging a snapshot image on a specific wall surface of a space image in which an exhibition space is expressed in three dimensions to follow a stereoscopic element of the space image, thus quickly and efficiently generating a stereoscopic exhibition image for providing a virtual exhibition space.

Furthermore, because of not using a three-dimensional engine or a VR technology, the above-mentioned inventive concept may generate a stereoscopic exhibition image for providing a virtual exhibition space without damage of work content.

Furthermore, according to the inventive concept, because the size and the number of data to be processed to provide a virtual exhibition space are relatively small, a relatively short time may be taken to load a stereoscopic exhibition image and a user terminal having general performance may easily process the stereoscopic exhibition image.

The effects of the inventive concept are not limited to the above-described effects and other effects which are not described herein will become apparent to those skilled in the art from the following description.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A virtual exhibition space providing method implemented by a computer, the method comprising:
   preparing for a space image in which an exhibition space including a plurality of wall surfaces is expressed in three dimensions;
   obtaining scales and slope values of the plurality of wall surfaces on the space image with respect to the exhibition space by analyzing the plurality of wall surfaces on the space image;
   preparing for a wall surface image of a specific wall surface, the wall surface image being where the specific wall surface among the plurality of wall surfaces on the space image is expressed in two dimensions;
   overlapping and arranging one or more work images at a specific size at a specific location on the wall surface image;
   generating a snapshot image of the specific wall surface, the snapshot image being where the one or more work images are overlapped and arranged on the wall surface image; and
   generating an exhibition image by overlapping and arranging the snapshot image on the specific wall surface of the space image using the scale and the slope value of the specific wall surface on the space image and the snapshot image to follow a stereoscopic element of the space image.

2. The method of claim 1, wherein the space image has a shape where a plurality of one-point perspective or a plurality of two-point perspective are integrated.

3. The method of claim 1, wherein horizontal to vertical ratios of the plurality of wall surfaces are fixed to the same value.

4. The method of claim 3, wherein the analyzing of the plurality of wall surfaces on the space image to obtain the scales and slope values of the plurality of wall surfaces on the space image with respect to the exhibition space includes:
   obtaining coordinates of four corners of the plurality of wall surfaces on the space image; and
   obtaining the slope values of the plurality of wall surfaces on the space image based on the fixed horizontal to vertical ratios of the plurality of wall surfaces and the coordinates of the four corners of the plurality of wall surfaces on the space image.

5. The method of claim 1, wherein the overlapping and arranging of the one or more work images at the specific size at the specific location on the wall surface includes:
   overlapping and arranging the one or more work images at the specific size at the specific location on the wall surface image depending on a command of a first user, and wherein the command of the first user includes one or more of movement, rotation, zoom-in, and zoom-out of the one or more work images.

6. The method of claim 1, further comprising:
providing a second user with the exhibition image.

7. The method of claim 6, further comprising:
providing the second user with the snapshot image depending on a selection of the second user for the specific wall surface among the plurality of wall surfaces on the exhibition image.

8. The method of claim 7, further comprising:
providing the second user with a work image of a specific work depending on a selection of the second user for the specific work among one or more works on the snapshot image.

9. A computer, comprising:
a processor; and
a memory storing a computer program configured to be executed by the processor,
wherein the computer program:
performs a first process of preparing for a space image in which an exhibition space including a plurality of wall surfaces is expressed in three dimensions;
performs a second process of obtaining scales and slope values of the plurality of wall surfaces on the space image with respect to the exhibition space by analyzing the plurality of wall surfaces on the space image;
performs a third process of preparing for a wall surface image of a specific wall surface, the wall surface image being where the specific wall surface among the plurality of wall surfaces on the space image is expressed in two dimensions;
performs a fourth process of overlapping and arranging one or more work images at a specific size at a specific location on the wall surface;
performs a fifth process of generating a snapshot image of the specific wall surface, the snapshot image being where the one or more work images are overlapped and arranged on the wall surface image; and
performs a sixth process of generating an exhibition image by overlapping and arranging the snapshot image on the specific wall surface of the space image using the scale and the slope value of the specific wall surface on the space image and the snapshot image to follow a stereoscopic element of the space image.

10. The computer of claim 9, wherein the space image has a shape where a plurality of one-point perspective or a plurality of two-point perspective are integrated.

11. The computer of claim 9, wherein horizontal to vertical ratios of the plurality of wall surfaces are fixed to the same value.

12. The computer of claim 11, wherein the second process obtains coordinates of four corners of the plurality of wall surfaces on the space image and obtains the slope values of the plurality of wall surfaces on the space image based on the fixed horizontal to vertical ratios of the plurality of wall surfaces and the coordinates of the four corners of the plurality of wall surfaces on the space image.

13. The computer of claim 9, wherein the sixth process overlaps and arranges the one or more work images at the specific size at the specific location on the wall surface image depending on a command of a first user, and
wherein the command of the first user includes one or more of movement, rotation, zoom-in, and zoom-out of the one or more work images.

14. The computer of claim 9, wherein the computer program further performs a seventh process of providing a second user with the exhibition image.

15. The computer of claim 14, wherein the computer program further includes the seventh process of providing the second user with the snapshot image depending on a selection of the second user for the specific wall surface among the plurality of wall surfaces on the exhibition image.

16. The computer of claim 14, wherein the computer program further includes an eighth process of providing the second user with a work image of a specific work depending on a selection of the second user for the specific work among one or more works on the snapshot image.

17. A storage medium storing a program combined with a hardware computer device for executing a virtual exhibition space providing method, the program comprising:
performing a first process of preparing for a space image in which an exhibition space including a plurality of wall surfaces is expressed in three dimensions;
performing a second process of obtaining scale and slope values of the plurality of wall surfaces on the space image with respect to the exhibition space by analyzing the plurality of wall surfaces on the space image;
performing a third process of preparing for a wall surface image of a specific wall surface, the wall surface image being where the specific wall surface among the plurality of wall surfaces on the space image is expressed in two dimensions;
performing a fourth process of overlapping and arranging one or more work images at a specific size at a specific location on the wall surface;
performing a fifth process of generating a snapshot image of the specific wall surface, the snapshot image being where the one or more work images are overlapped and arranged on the wall surface image; and
performing a sixth process of generating an exhibition image by overlapping and arranging the snapshot image on the specific wall surface of the space image using the scale and the slope value of the specific wall surface on the space image and the snapshot image to follow a stereoscopic element of the space image.

* * * * *